(12) United States Patent
Peters et al.

(10) Patent No.: US 10,922,973 B2
(45) Date of Patent: Feb. 16, 2021

(54) RSS-BASED PARKING DETECTION SYSTEM AND METHOD THEREOF

(71) Applicant: Robert Bosch GmbH, Stuttgart (DE)

(72) Inventors: Christian Peters, Palo Alto, CA (US); Maurizio Bocea, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/312,285

(22) PCT Filed: Jun. 27, 2017

(86) PCT No.: PCT/EP2017/065910
§ 371 (c)(1),
(2) Date: Dec. 21, 2018

(87) PCT Pub. No.: WO2018/002087
PCT Pub. Date: Jan. 4, 2018

(65) Prior Publication Data
US 2019/0236953 A1    Aug. 1, 2019

Related U.S. Application Data

(60) Provisional application No. 62/354,881, filed on Jun. 27, 2016.

(51) Int. Cl.
*G08G 1/14* (2006.01)
*G01S 5/02* (2010.01)
(Continued)

(52) U.S. Cl.
CPC .............. *G08G 1/143* (2013.01); *G01S 5/02* (2013.01); *G01S 13/04* (2013.01); *G08G 1/142* (2013.01);
(Continued)

(58) Field of Classification Search
CPC ........... G01S 13/04; G01S 5/02; G08G 1/142; G08G 1/143; G08G 1/144; G08G 1/146; G08G 1/147; H04B 17/318; H04W 4/40
See application file for complete search history.

(56) References Cited

U.S. PATENT DOCUMENTS

| | | | | |
|---|---|---|---|---|
| 2015/0294431 A1* | 10/2015 | Fiorucci | ................. | G06Q 50/26 705/13 |
| 2016/0133125 A1* | 5/2016 | Sandbrook | ............... | G01V 3/12 340/933 |
| 2018/0114438 A1* | 4/2018 | Rajagopalan | .......... | G08G 1/144 |

FOREIGN PATENT DOCUMENTS

| | | |
|---|---|---|
| CN | 102722987 A | 10/2012 |
| CN | 102722997 A | 10/2012 |
| CN | 204256991 U | 4/2015 |

OTHER PUBLICATIONS

International Search Report corresponding to PCT Application No. PCT/EP2017/065910, dated Oct. 4, 2017 (English language document) (3 pages).

* cited by examiner

*Primary Examiner* — Thomas S McCormack
(74) *Attorney, Agent, or Firm* — Maginot, Moore & Beck LLP

(57) ABSTRACT

A parking detection system comprises a plurality of sensor nodes configured to detect and monitor an event of a parking space, at least one of the sensor nodes detected the event and generates a data package including a received signal strength (RSS) value and an access point network that receives the data packet and measure the RSS value of the data packet, wherein the access point network measures a variation in the RSS value for detecting and monitoring of the event by measuring a change in propagation patterns of radio signals distorted by a vehicle.

18 Claims, 4 Drawing Sheets

(51) Int. Cl.
  *G01S 13/04*  (2006.01)
  *H04B 17/318*  (2015.01)
  *H04W 4/40*  (2018.01)
(52) U.S. Cl.
  CPC ............. *G08G 1/144* (2013.01); *G08G 1/146* (2013.01); *G08G 1/147* (2013.01); *H04B 17/318* (2015.01); *H04W 4/40* (2018.02)

RSS-BASED PARKING DETECTION SYSTEM AND METHOD THEREOF

CROSS-REFERENCE TO RELATED APPLICATION

This application is a 35 U.S.C. § 371 National Stage Application of PCT/EP2017/065910, filed on Jun. 27, 2017, which claims the benefit of U.S. Provisional Application No. 62/354,881, filed Jun. 27, 2016, the disclosures of which are herein incorporated by reference in their entirety.

FIELD

This disclosure relates generally to parking detection systems and, more particularly, to RSS based parking detection system and method thereof.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure are related to systems and methods for detecting and monitoring events of any number of parking spots. A parking detection system comprises a plurality of sensor nodes configured to detect and monitor an event of a parking space, at least one of the sensor nodes detected the event and generates a data package including a received signal strength (RSS) value and an access point network that receives the data packet and measure the RSS value of the data packet, wherein the access point network measures a variation in the RSS value for detecting and monitoring of the event by measuring a change in propagation patterns of radio signals distorted by a vehicle. The plurality of sensor nodes located in a plurality of parking space identify the event and transmit the data packet to the access point network. The access point network measures the variation in the RSS value of the data packet before the data packet is transmitted to at least one of a server and a network. The access point network comprises a hub configured to provide connection of a plurality of sensor nodes and the access point network to at least one of the server and the network. A client device communicatively coupled to the parking detection system via at least one of the server and the network, the client device including a display for displaying the event of the parking space. The event including at least one of a location of the parking space, availability of the parking space, and information of the parking area.

According to another aspect of the disclosure, a parking detection system comprises a plurality of sensor nodes configured to detect and monitor events of a plurality of parking spaces, at least one of the sensor nodes detected the event and generates a data package including a received signal strength (RSS) value and a plurality of access point networks that receive the data packet and measure the RSS value of the data packet, wherein at least one of the plurality of access point networks measures a variation in the RSS value for detecting and monitoring of the event by measuring a change in propagation patterns of radio signals distorted by a vehicle. The plurality of sensor nodes located in the plurality of parking spaces identify the event and transmit the data packet to one or more of the access point networks. One or more of the access point networks measure the variation in the RSS value of the data packet before the data packet is transmitted to at least one of a server and a network. Each access point network comprises a hub configured to provide connection of a plurality of sensor nodes and the access point network to at least one of the server and the network. A client device communicatively coupled to the parking detection system via at least one of the server and the network, the client device including a display for displaying the event of the parking space. The event including at least one of a location of the parking space, availability of the parking space, and information of the parking area. The client device displays the event of the parking space in at least one of text format, image format, and video format.

According to another aspect of the disclosure, a method comprises detecting and monitoring, by a plurality of sensor nodes, an event of a parking space, receiving, by an access point network, a data packet including a RSS value of the event, broadcasting the event of the parking space to at least one of a server, a network, a plurality of vehicles, and a plurality of thin clients, wherein the access point network measures a variation in the RSS value for detecting and monitoring of the event by measuring a change in propagation patterns of radio signals distorted by a vehicle. The method further comprises installing the plurality of the sensor nodes in the plurality of parking space, transmitting the data packet by the plurality of the sensor nodes to the access point network, and displaying the event on the client device after receiving the event including the data packet from the access point network. The event including at least one of a location of the parking space, availability of the parking space, and information of the parking area.

According to another aspect of the disclosure, a system includes an access point network communicatively coupled to any suitable sensor nodes. One or more sensor nodes may be positioned in each parking spot. Each of the sensor nodes is used in the system to provide detecting and monitoring of the events of the parking spot. The events include parameters associated with at least one of the location, availability, parking area information of the vacant spot, or combination thereof in real-time. The parking area information of the vacant spot includes width and depth of the detected vacant spot or any nearby vacant spots in proximity to the detected vacant spot. The detected events may be shared with another system, vehicle drivers, or combination thereof. The events detected by the sensor nodes are either transmitted, reported, or broadcasted periodically to at least one of the access point network. In another embodiment, a server, a network, a client device, or combination thereof may be communicatively coupled to the access point network, the sensor nodes, or combination thereof. In yet another embodiment, the sensor nodes may be used to monitor parameters associated with nearby parking spots. In another embodiments, the sensor nodes may be used to monitor parameters associated with a vehicle such as the profile of the detected vehicle. In yet another embodiment, the sensor nodes may be used to maneuver any autonomous vehicles in the parking. The sensor nodes may be inertial sensors, motion sensors, thermal sensors, vibration sensors, optical sensors, infrared sensors, light sensors, cameras, accelerometers, imaging sensors, magnetometers, acoustic sensors, transducers, or combination thereof. The events detected by the sensor nodes include received signal strength (RSS) value. The RSS value is a function of distance between any two devices, defined as a transmitter, and a receiver, communicating wirelessly, which varies due to various in-path interferences such as moving people, environmental interferences, moving vehicles, or degradation of radio channel, over time. The receiver measures the RSS of the data packets broadcasted by the transmitter. The RSS value is intended to indicate a change in the propagation patterns of the radio signals distorted by any vehicles in parking. The change in the propagation patterns of the radio signals introduces a variation in the RSS value which can be used for detecting and monitoring of the parking events.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications without departing from the spirit and scope of the described embodiments. Thus, the described embodiments are not limited to the embodiments shown, but are to be accorded the widest scope consistent with the principles and features disclosed herein.

Figure 1:
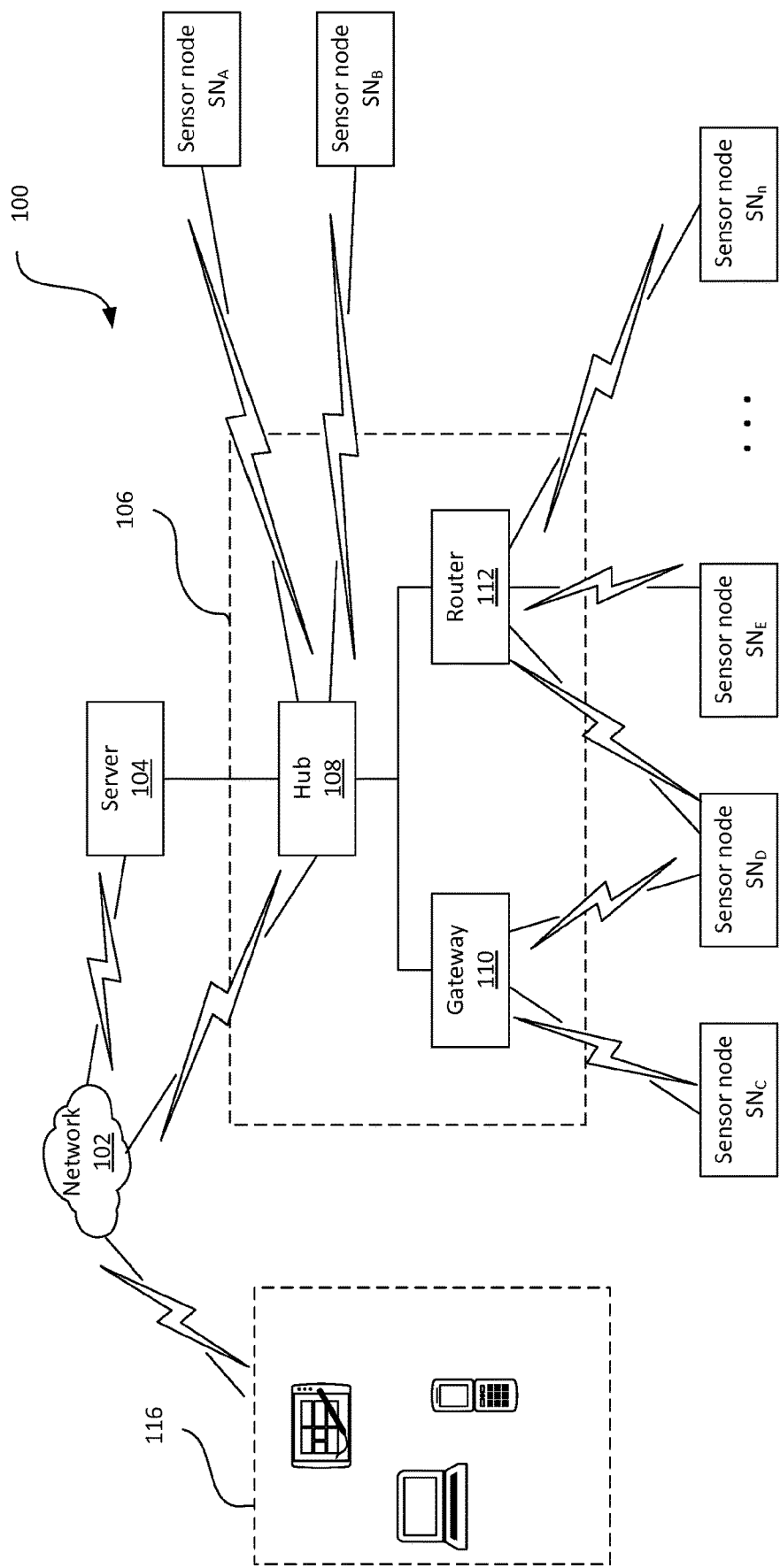
FIG. 1 is a block diagram depicting a parking detection system in accordance with embodiments of a described disclosure.

FIG. 1 illustrates an exemplary embodiment of a parking detection system 100 configured to detect and monitor an event. The event include location of the parking spot, parking spot availability, parking area information of the vacant spot, or combination thereof in real-time. The parking area information of the vacant spot includes its dimension such as width and depth of the vacant spot. The parking detection system 100 is also configured to share the events with another parking detection system, vehicle drivers either near-by or distant. The parking detection system 100 generally comprises a network 102 such as a wireless network. In some embodiments, the parking detection system 100 includes a wired network. The parking detection system 100, in one embodiment, is a centralized control and monitoring system capable of managing a plurality of parking spots in various locations. The network 102 interfaces either directly or indirectly with a server 104, an access point network 106, a client machine 116, or combination thereof via any suitable communication links which can be wired communication and/or wireless communication. The wireless communication link may include cellular protocol, data packet protocol, radio frequency protocol, satellite band, infrared channel, or any other protocol capable to transmit data among any client machine 116, the server 104, and the network 102, and the access point network 106. The wired communication link may include any wired line link.

In an example embodiment, the network 102 includes at least one computer network, at least one data network, at least one telecommunications network, any suitable network, or any combination thereof. The network 102 is not limited in its structure, configuration, and/or components as long as it is able to provide the necessary communications between any client machine 116, the server 104, and the access point network 106. The network 102 comprises one or more sub-networks, and can be installed between any combination of the client machine 116 and the server 104. In some embodiments, the network 102 can be, for example, a local-area network (LAN), a metropolitan area network (MAN), a wide area network (WAN), a primary network comprising multiple sub-networks located between the client machine 116 and the server 104, a cloud network, or any combination thereof. Still further embodiments include the network 102 that can include any network types such as a point to point network, a broadcast network, a telecommunication network, a data communication network, a computer network, an ATM (Asynchronous Transfer Mode) network, a SONET (Synchronous Optical Network) network, a SDH (Synchronous Digital Hierarchy) network, a wireless network, a wireline network, and the like. Depending on the application, other networks may be used so that data are exchanged between the client machine 116, the server 104, and the access point network 106. Network topology of the network 102 can differ within different embodiments which may include a bus network topology, a star network topology, a ring network topology, a repeater-based network topology, or a tiered-star network topology. Additional embodiments may include a network of mobile telephone networks that use a protocol to communicate among mobile devices, where the protocol can be for example AMPS, TDMA, CDMA, GSM, GPRS, UMTS, LTE or any other protocol able to transmit data among client machines 116. The server 104 may be optionally integrated into one of the networks 102, 106. In some embodiments, one or more servers may be communicatively coupled to the client machine 116 over the network 102, the access point network 106, or combination thereof. The server 104 may be an application server, a certificate server, a mobile information server, an e-commerce server, a FTP server, a directory server, CMS server, a printer server, a management server, a mail server, a public/private access server, a real-time communication server, a database server, a proxy server, a streaming media server, or the like.

The access point network 106 comprises a hub 108. Although one hub 108 is illustrated, more the one hub 108 may be incorporated into the access point network 106. In some embodiments, more than one access point network 106 may be communicatively coupled to the client machine 116 over the network 102, the server 104, or combination thereof. The hub 108 provides for the connection of one or more gateways 110, one or more sensor nodes $SN_A$-$SN_n$, or combination thereof to at least one of the server 104 and the network 102 via suitable communication links. The gateway 110 may be formed either as part of the access point network 106 or as a separate device and is communicatively coupled to at least one of the access point network 106, the server 104, one or more sensor nodes $SN_A$-$SN_n$, or combination therefore via suitable communication link. Included within the access point network 106 is an optional routers 112. The router 112 may be configured to provide wireless communications between two or more of client devices 116, the hub 108, and the gateway 110. In one embodiment, the router 112 is used as a signal passing device such as a signal amplifier when the distance between the gateway 110 and any sensor nodes $SN_A$-$SN_n$ is greater than a threshold. In some embodiments, signals transmitted by any sensor nodes $SN_A$-$SN_n$ may pass through one or more routers 112 wirelessly before reaching the gateway 110. In another embodiment, signals transmitted by the sensor nodes $SN_A$-$SN_n$ may pass through one or more wireless routers 112 and the gateway 110 before reaching the hub 108. The client machine 116 may be a personal computer or desktop computer, a laptop, a cellular or smart phone, a tablet, a personal digital assistant (PDA), a gaming console, an audio device, a video device, a diagnostic device, an entertainment device such as a television, a vehicle infotainment, a wearable device, a thin client system, a thick client system, or the like. In some embodiments, the client machine 116 is a single client machine or a single group of client machines. The client devices 116 may be suitable either for use in a vehicle, for use with the parking detection system 100, or combination thereof.

Figure 2:
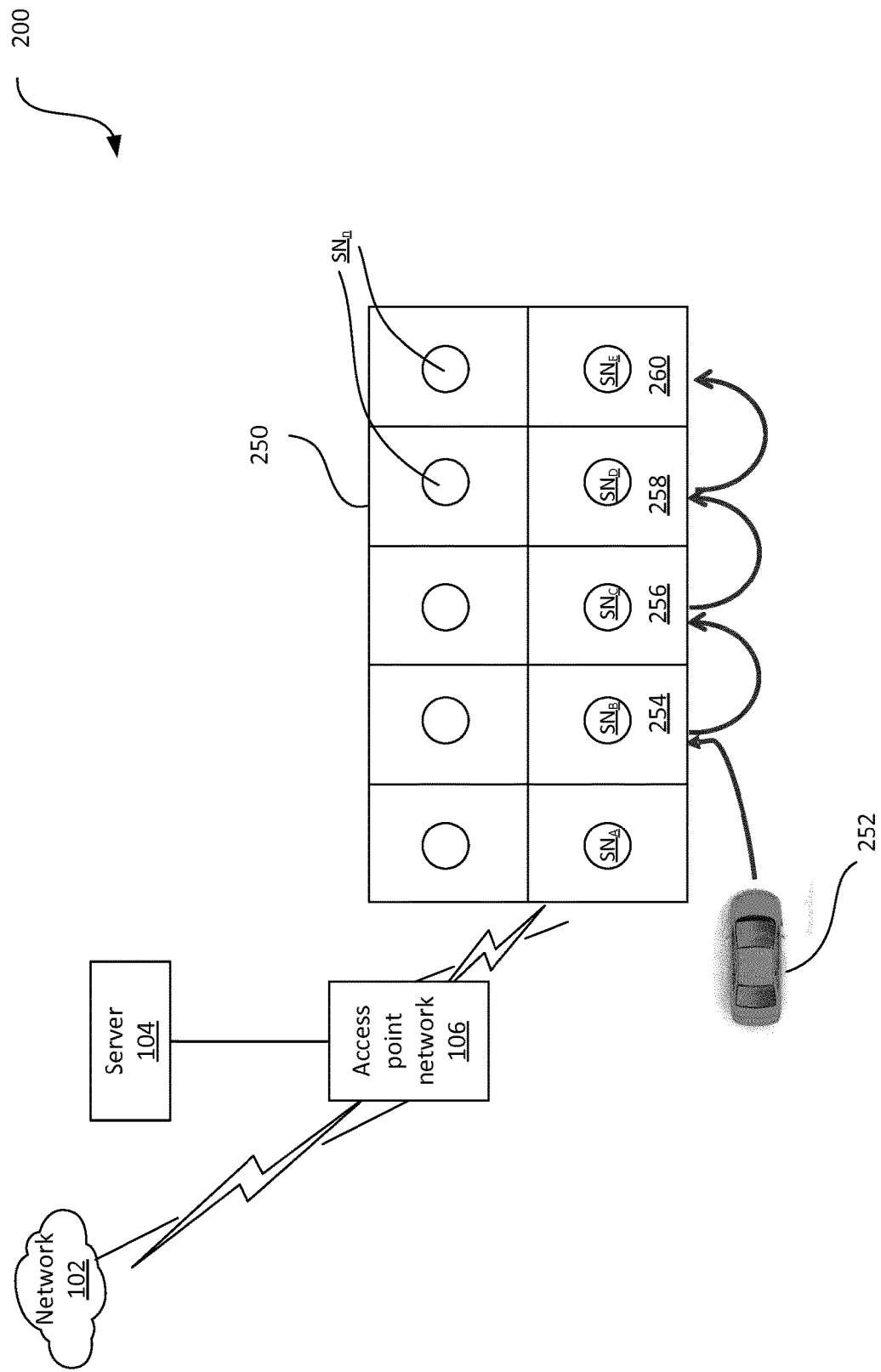
FIG. 2 is an example of one parking layout with a plurality of sensors in accordance with one described embodiment of the disclosure.
Figure 3:
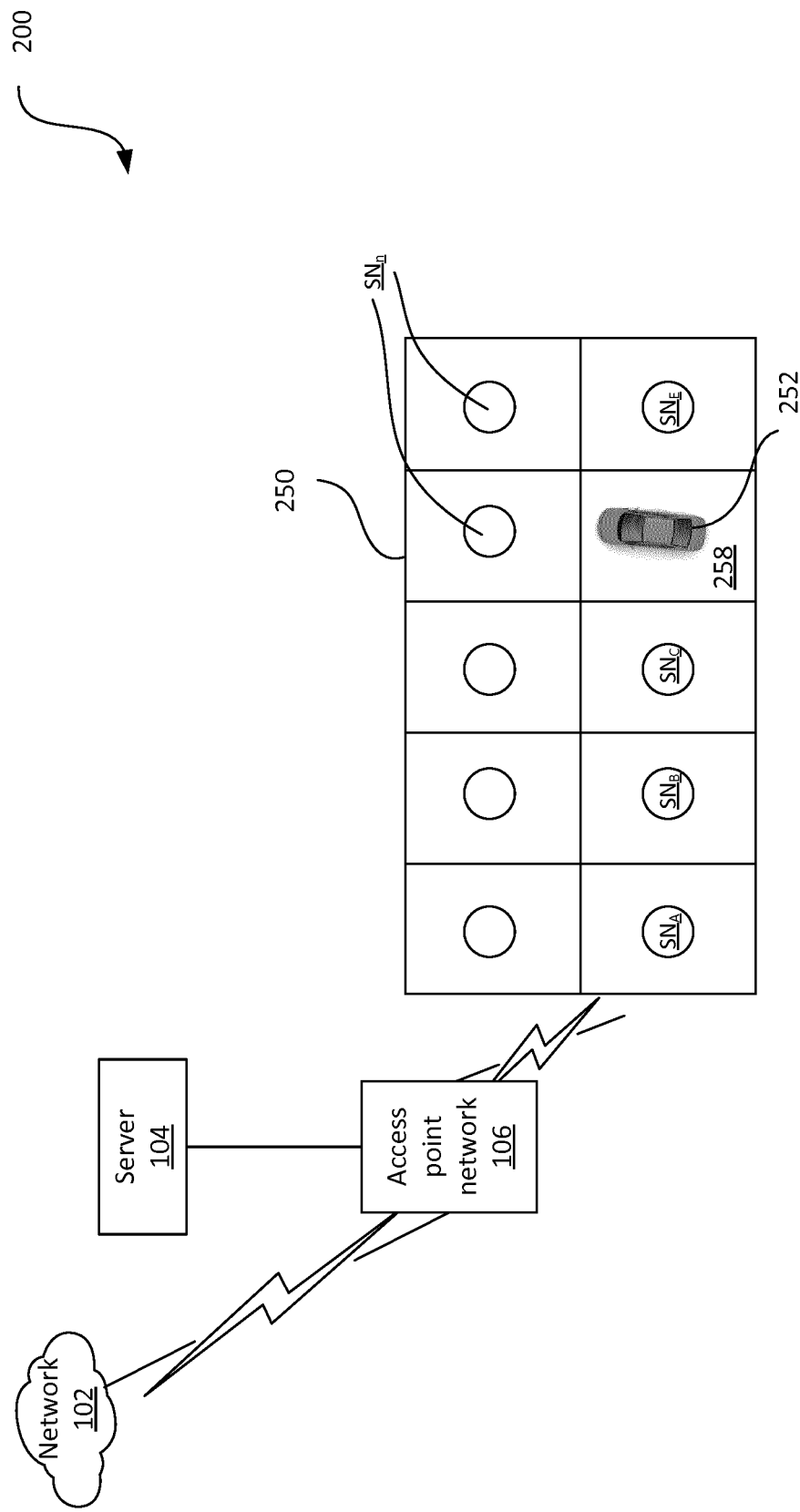
FIG. 3 is the example of one parking layout with a plurality of sensors of FIG. 2 in accordance with the described embodiment of the disclosure.

FIGS. 2 and 3 illustrate an example of a parking layout 250 with sensor nodes $SN_A$-$SN_n$. Each sensor node $SN_A$-$SN_n$ is positioned or located in each parking spot. In one embodiment, more than one sensor node may be positioned in the parking spot. In some embodiments, any number of sensor nodes $SN_A$-$SN_n$ may be mounted for example on the ceiling directly above the parking spots, on the curbs, directly in the parking spots, or directly in the streets where the parking spots are located. Each sensor node $SN_A$-$SN_n$ used in a parking detection system 200 is capable of detecting and monitoring of the events of the parking spot. The events include parameters associated with at least one of the location, availability, parking area information of the vacant spot, or combination thereof in real-time. The parking area information of the vacant spot includes its dimension such as width and depth of the detected vacant spot or any nearby vacant spots in proximal to the detected vacant spot. The detected events may be shared with another parking detection system 200, vehicle drivers, or combination thereof. The events detected by the sensor nodes $SN_A$-$SN_n$ are either transmitted, reported, or broadcasted periodically to at least one of the access point network 106, the server 104, the network 102, the client device 116, or combination thereof. In some embodiments, the sensor nodes $SN_A$-$SN_n$ may be used to monitor parameters associated with nearby parking spots. In another embodiment, the sensor nodes $SN_A$-$SN_n$ may be used to monitor parameters associated with a vehicle 252 such as the profile of the detected vehicle 252. In yet another embodiments, the sensor nodes $SN_A$-$SN_n$ may be used to maneuver any autonomous vehicles in parking. The sensor nodes $SN_A$-$SN_n$ may be inertial sensors, motion sensors, thermal sensors, vibration sensors, optical sensors, infrared sensors, light sensors, cameras, accelerometers, imaging sensors, magnetometers, acoustic sensors, transducers, or combination thereof. Other suitable sensor nodes or sensing elements are possible, depending on the application. The events detected by the sensor nodes $SN_A$-$SN_n$ include received signal strength (RSS) value. The RSS value is a function of distance between any sensor node $SN_A$-$SN_n$, defined as a transmitter, and the access point network 106, defined as a receiver, which varies due to various in-path interferences such as moving people, environmental interferences, moving vehicle, degradation of radio channel, etc, over time. The receiver 106 measures the RSS of a data packet broadcasted by the transmitter $SN_A$-$SN_n$. The RSS value is part of the data packet transmitted by any sensor node $SN_A$-$SN_n$ and the value is intended to measure a change in the propagation patterns of the radio signals distorted by any vehicles 252 in parking. The change in the propagation patterns of the radio signals introduces a variation in the RSS value for detecting and monitoring of the parking events. In doing so, it enhances the accuracy of detecting and monitoring of the events and minimizes any false positive and false negative observations. Moreover, the use of measured RSS value of the data packets transmitted by any sensor node $SN_A$-$SN_n$ provides additional information without requiring dedicated sensors (i.e., the radio channel acts as sensor), save significant installation and equipment costs for installing additional sensors as well as electrical power or any other kind of energy which would be needed to operate an additional sensor.

As an example, when the vehicle 252 approaches the parking layout 250 having a plurality of sensor nodes $SN_A$-$SN_n$ positioned in each parking spot and each of the sensor nodes $SN_A$-$SN_n$ is capable of detecting and monitoring the events of the parking spot. If the vehicle 252 occupies a parking spot 254 in which a sensor node $SN_B$ is positioned, the sensor node $SN_B$ detects an event, i.e. the vehicle on the parking spot 254, and triggers the transmission of data packets to the access point network 106. The access point network 106 measures the RSS of the data packets transmitted by the sensor node $SN_B$, and transmits the data packet including RSS value of the event to at least one of the server 104, the network 106, or combination thereof. The access point network 106 in proximity to the sensor nodes $SN_A$-$SN_n$ may be mounted to signboards, road/traffic signs, traffic markers, street signs, location markers, mile markers or the like. In some embodiments, the hub 108 is mounted to a signboard whereas the gateway 110 or the router 112 is mounted to a traffic light. As the vehicle 252 exits parking spot 254 and enters another parking spot 258, the sensor node $SN_C$ positioned in the parking spot 258 detects another event, i.e. the vehicle on the parking spot 258, and triggers the sending of data packets to the access point network 106. The access point network 106 measures the RSS of the data packets transmitted by the sensor node $SN_C$, and transmits the data packets including RSS value of the event to at least one of the server 104, the network 106, or combination thereof. The sensor nodes $SN_A$-$SN_n$ may also monitor parameters associated with a vehicle 252 such as the profile of the detected vehicle 252. The parking detection system 200 which receives the detected event from any sensor nodes $SN_A$-$SN_n$ may broadcast the detected event to any nearby vehicles other than vehicle 252.

Figure 4:
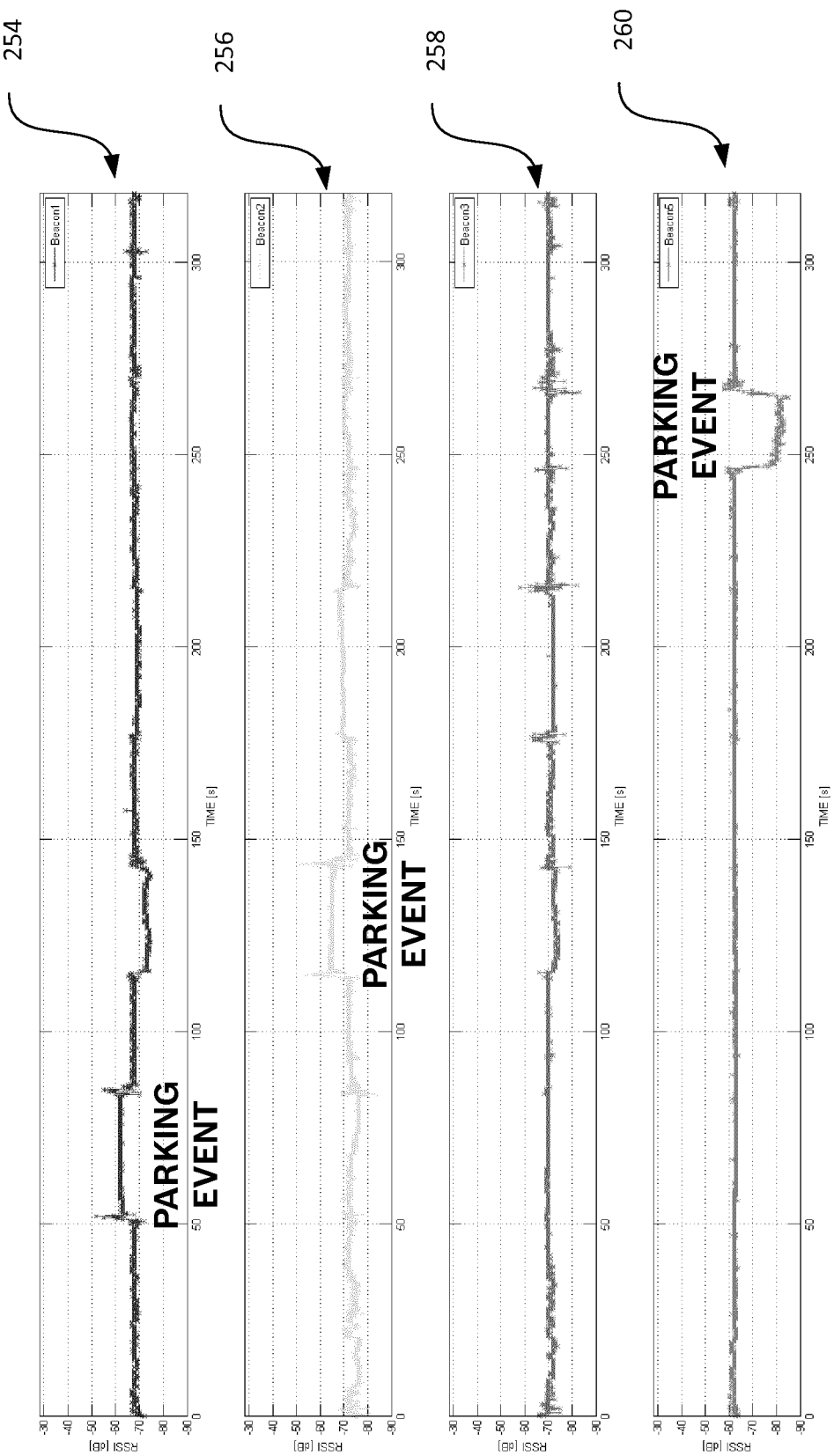
FIG. 4 illustrates 4 real-time occupancy status graphs of the parking spot in the parking layout of FIGS. 2 and 3.

FIG. 4 illustrates 4 real-time occupancy status graphs, based on RSS information, of the parking spot in the parking layout of FIGS. 2 and 3. As the vehicle 252 as illustrated in FIGS. 2 and 3 enters parking spot 254, sensor node $SN_A$ positioned in the parking spot 254 detects the event and transmits data packets to at least one of the access point system 106, the server 104, the network 102, or combination thereof. The receiving device measures the RSS of the data packets transmitted by sensor node $SN_A$. As can be seen, the vehicle 252 exits parking spot 254 and enters first parking spot 256. Then, it exits parking spot 256 and enters parking spot 260. The RSS of the sensor node $SN_E$ positioned in the parking spot 260 varies, indicating a parking event, whereas the RSS of the sensor node $SN_D$ positioned in the parking spot 258 does not vary, not detecting the parking event, i.e. parking slot is available.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the spirit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A parking detection system comprising:
   a plurality of sensor nodes configured to detect and to monitor an event of a parking space of a plurality of parking spaces, and to generate a data packet including a received signal strength (RSS) value, and parameters associated with the event of the parking space including parking area information having width and depth data of a corresponding parking space of the plurality of parking spaces when the corresponding parking space is vacant; and
   an access point network that receives the data packet,
   wherein the access point network measures a variation in the RSS value for detecting and monitoring of the event by measuring a change in propagation patterns of radio signals distorted by a vehicle,
   wherein each sensor node of the plurality of sensor nodes is mounted directly to a corresponding parking space of the plurality of parking spaces.

2. The parking detection system of claim 1, wherein each sensor node of the plurality of sensor nodes is configured to identify a corresponding event and to transmit a corresponding data packet to the access point network.

3. The parking detection system of claim 1 wherein the access point network measures the variation in the RSS value of the data packet before the data packet is transmitted to at least one of a server and a network.

4. The parking detection system of claim 3 wherein the access point network comprising:
   a hub configured to provide connection of the plurality of sensor nodes and the access point network to at least one of the server and the network.

5. The parking detection system of claim 3 further comprising:
   a client device communicatively coupled to the parking detection system via at least one of the server and the network, the client device including a display for displaying the event of the parking space,
   wherein the event including at least one of a location of the parking space, availability of the parking space, and the parking area information.

6. A parking detection system comprising:
   a plurality of sensor nodes configured to detect and to monitor events of a plurality of parking spaces, and to generate a data packet including a received signal strength (RSS) value, and parameters associated with the events of the plurality of parking spaces including parking area information having width and depth data of a corresponding parking space of the plurality of parking spaces when the corresponding parking space is vacant; and
   a plurality of access point networks that receive the data packet,
   wherein at least one of the plurality of access point networks measures a variation in the RSS value for detecting and monitoring of the event by measuring a change in propagation patterns of radio signals distorted by a vehicle,
   wherein each sensor node of the plurality of sensor nodes is mounted directly to a corresponding parking space of the plurality of parking spaces.

7. The parking detection system of claim 6, wherein each sensor node of the plurality of sensor nodes is configured to identify a corresponding event and to transmit a corresponding data packet to one or more of the access point networks.

8. The parking detection system of claim 6 wherein one or more of the access point networks measure the variation in the RSS value of the data packet before the data packet is transmitted to at least one of a server and a network.

9. The parking detection system of claim 8 wherein each access point network comprising:
a hub configured to provide connection of the plurality of sensor nodes and the access point network to at least one of the server and the network.

10. The parking detection system of claim 8 further comprising a client device communicatively coupled to the parking detection system via at least one of the server and the network, the client device including a display for displaying the event of the parking space.

11. The parking detection system of claim 10 wherein the event including at least one of a location of the parking space, availability of the parking space, and the parking area information.

12. A method comprising:
detecting and monitoring, by a plurality of sensor nodes, an event of a parking space of a plurality of parking spaces to detect when the parking spaces are occupied or vacant, each sensor node of the plurality of sensor nodes mounted directly to a corresponding parking space of the plurality of parking spaces;
generating parameters with the plurality of sensor nodes, the generated parameters associated with parking spaces of the plurality of parking spaces that are detected to be vacant, the generated parameters including a width and a depth of the vacant parking spaces;
receiving, by an access point network, the parameters and a data packet including a RSS value of the event;
broadcasting the parameters and the event of the parking space to at least one of a server, a network, a plurality of vehicles, and a plurality of thin clients;
wherein the access point network measures a variation in the RSS value for detecting and monitoring of the event by measuring a change in propagation patterns of radio signals distorted by a vehicle.

13. The method of claim 12 wherein transmitting the data packet by the plurality of the sensor nodes to the access point network.

14. The method of claim 13 wherein displaying the event on the client device after receiving the event including the data packet from the access point network.

15. The method of claim 14 wherein the event including at least one of a location of the parking space, availability of the parking space, and information of the parking area.

16. The parking detection system of claim 1, wherein the change in propagation patterns exists for at least twenty five seconds.

17. The method of claim 12, further comprising:
generating a profile of a detected vehicle in one of the parking spaces of the plurality of parking spaces with the plurality of sensor nodes,
wherein the profile of the detected vehicle is included in the generated parameters.

18. The method of claim 12, further comprising:
using the plurality of sensor nodes to maneuver an autonomous vehicle into one of the parking spaces of the plurality of parking spaces.

* * * * *